(12) United States Patent
Li et al.

(10) Patent No.: US 10,949,199 B1
(45) Date of Patent: Mar. 16, 2021

(54) COPYING PACKET DATA TO MIRROR BUFFER

(71) Applicant: Barefoot Networks, Inc., Santa Clara, CA (US)

(72) Inventors: Xiaozhou Li, San Jose, CA (US); Jeongkeun Lee, Mountain View, CA (US); Srivathsa Dhruvanarayan, Saratoga, CA (US); Anurag Agrawal, Santa Clara, CA (US); Changhoon Kim, Palo Alto, CA (US); Alain Loge, Mountain View, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/836,528

(22) Filed: Dec. 8, 2017

Related U.S. Application Data (60) Provisional application No. 62/558,748, filed on Sep. 14, 2017.

(51) Int. Cl.

| | |
|---|---|
| *H04L 12/66* | (2006.01) |
| *G06F 9/30* | (2018.01) |
| *G06F 9/38* | (2018.01) |
| *G06F 9/28* | (2006.01) |
| *H04W 8/30* | (2009.01) |
| *H04L 12/743* | (2013.01) |

(52) U.S. Cl.
CPC ............ *G06F 9/30036* (2013.01); *G06F 9/28* (2013.01); *G06F 9/3867* (2013.01); *G06F 9/3885* (2013.01); *H04L 45/7457* (2013.01); *H04W 8/30* (2013.01)

(58) Field of Classification Search
CPC .......................... G06F 9/30036; G06F 9/3867
See application file for complete search history.

(56) References Cited

U.S. PATENT DOCUMENTS

| | | | |
|---|---|---|---|
| 7,391,786 B1 | 6/2008 | Prasad et al. | |
| 8,976,791 B1 * | 3/2015 | Sivan ................... | H04L 12/4625 370/392 |
| 9,537,793 B2 | 1/2017 | Kapadia et al. | |
| 9,755,932 B1 | 9/2017 | Godbole et al. | |
| 10,135,734 B1 | 11/2018 | Singh et al. | |
| 10,230,810 B1 * | 3/2019 | Bhide ................ | H04L 67/2842 |

(Continued)

OTHER PUBLICATIONS

Non-Published commonly Owned U.S. Appl. No. 15/161,262, filed May 22, 2016, 41 pages, Barfoot Networks, Inc.

(Continued)

*Primary Examiner* — Chi H Pham
*Assistant Examiner* — Fahmida S Chowdhury
(74) *Attorney, Agent, or Firm* — Compass IP Law PC (57) ABSTRACT

Some embodiments provide a method for a network forwarding integrated circuit (IC). The method receives packet data with an instruction to copy a portion of the packet data to a temporary storage of the network forwarding IC. The portion is larger than a maximum entry size of the temporary storage. The method generates a header for each of multiple packet data sections for storage in entries of the temporary storage, with each packet data section including a sub-portion of the packet data portion. The method sends the packet data sections with the generated headers to the temporary storage for storage in multiple separate temporary storage entries.

20 Claims, 7 Drawing Sheets

(56) References Cited

U.S. PATENT DOCUMENTS

| | | | |
|---|---|---|---|
| 10,608,939 B1 | 3/2020 | Kim et al. | |
| 16,810,727 | 3/2020 | Changhoon | |
| 2004/0022239 A1 | 2/2004 | Bosshart | |
| 2004/0208163 A1 | 10/2004 | Patel et al. | |
| 2005/0147042 A1 | 7/2005 | Pumadi et al. | |
| 2005/0276230 A1 | 12/2005 | Akahane et al. | |
| 2007/0183415 A1 | 8/2007 | Fischer et al. | |
| 2007/0195773 A1* | 8/2007 | Tatar | H04L 49/1546 370/392 |
| 2008/0168304 A1 | 7/2008 | Flynn et al. | |
| 2008/0247409 A1* | 10/2008 | Choudhury | H04L 49/90 370/412 |
| 2008/0256183 A1 | 10/2008 | Flynn et al. | |
| 2009/0109973 A1 | 4/2009 | Ilnicki | |
| 2010/0088756 A1* | 4/2010 | Balakrishnan | H04L 63/101 726/13 |
| 2010/0232443 A1 | 9/2010 | Pandey | |
| 2011/0164509 A1 | 7/2011 | Wengrovitz | |
| 2011/0194557 A1* | 8/2011 | Baban | H04L 49/10 370/390 |
| 2011/0289267 A1 | 11/2011 | Flynn et al. | |
| 2011/0296277 A1 | 12/2011 | Flynn et al. | |
| 2012/0140650 A1 | 6/2012 | Bruhn | |
| 2012/0179869 A1 | 7/2012 | Flynn et al. | |
| 2012/0230186 A1 | 9/2012 | Lee et al. | |
| 2013/0067294 A1 | 3/2013 | Flynn et al. | |
| 2013/0097367 A1 | 4/2013 | Flynn et al. | |
| 2014/0241361 A1 | 8/2014 | Bosshart et al. | |
| 2014/0241362 A1* | 8/2014 | Bosshart | H04L 45/74 370/392 |
| 2014/0244966 A1 | 8/2014 | Bosshart et al. | |
| 2014/0328180 A1 | 11/2014 | Kim et al. | |
| 2014/0328344 A1 | 11/2014 | Bosshart | |
| 2014/0334489 A1 | 11/2014 | Bosshart et al. | |
| 2014/0334819 A1 | 11/2014 | Mehrvar et al. | |
| 2015/0010000 A1 | 1/2015 | Zhang et al. | |
| 2015/0138976 A1 | 5/2015 | Lu et al. | |
| 2015/0139235 A1 | 5/2015 | Lu et al. | |
| 2015/0160879 A1* | 6/2015 | Flynn | G06F 3/065 711/103 |
| 2015/0281131 A1 | 10/2015 | Bhat et al. | |
| 2015/0334090 A1* | 11/2015 | Ling | H04L 67/10 726/13 |
| 2016/0080263 A1 | 3/2016 | Park et al. | |
| 2016/0134563 A1 | 5/2016 | Yu et al. | |
| 2016/0216913 A1 | 7/2016 | Bosshart | |
| 2016/0301603 A1* | 10/2016 | Park | H04L 41/0893 |
| 2016/0330127 A1* | 11/2016 | Kim | H04L 47/622 |
| 2017/0034058 A1 | 2/2017 | Sampath et al. | |
| 2017/0048312 A1 | 2/2017 | Moyer | |
| 2017/0126588 A1 | 5/2017 | Anand et al. | |
| 2017/0134283 A1 | 5/2017 | Iles et al. | |
| 2017/0134538 A1 | 5/2017 | Mahkonen et al. | |
| 2017/0142011 A1 | 5/2017 | Zhang et al. | |
| 2017/0163538 A1 | 6/2017 | Feng et al. | |
| 2017/0180273 A1 | 6/2017 | Daly et al. | |
| 2017/0195253 A1 | 7/2017 | Annaluru et al. | |
| 2017/0195292 A1 | 7/2017 | Pham et al. | |
| 2017/0222926 A1 | 8/2017 | Mack-Crane et al. | |
| 2017/0289034 A1 | 10/2017 | Bosshart et al. | |
| 2017/0295074 A1 | 10/2017 | Chandran et al. | |
| 2018/0041615 A1* | 2/2018 | Bosshart | H04L 69/22 |
| 2018/0367338 A1* | 12/2018 | Seshadri | H04L 12/4633 |
| 2019/0116132 A1 | 4/2019 | Suzuki | |

OTHER PUBLICATIONS

Non-Published commonly Owned U.S. Appl. No. 15/161,263, filed May 22, 2016, 41 pages, Barefoot Networks, Inc.

Non-Published commonly Owned U.S. Appl. No. 16/289,001, filed Feb. 28, 2019, 48 pages, Barefoot Networks, Inc.

First Office Action for U.S. Appl. No. 16/289,001, dated Jan. 23, 2020, 8 pages.

Kim, Changhoon et al., "In-band Network Telemetry (INT)", Barefoot Networks, Jun. 2016, 28 pages.

* cited by examiner

COPYING PACKET DATA TO MIRROR BUFFER

BACKGROUND

Forwarding elements are designed to process packets and forward those packets to their appropriate destination (or next hop). In addition, the administrator of a network may want to observe the packets that are processed by the forwarding element. While various devices exist to intercept packets on the wire (i.e., before being received by the forwarding element or after the forwarding element has transmitted the packets to their next destination), observing packet data during processing by the forwarding element is more difficult, and may require changes to the forwarding element structure and/or configuration itself.

BRIEF SUMMARY

Some embodiments of the invention provide a network forwarding IC with a packet processing pipeline that copies portions of packet data (e.g., an entire packet or a portion that is less than an entire packet) to a temporary storage. When the size of the packet data portion is larger than a maximum entry size of the temporary storage, the packet processing pipeline divides the packet data portion into multiple sections, and separately sends these sections to the temporary storage. The packet processing pipeline also generates a separate header for each section, which is sent to the temporary storage along with the packet data section. The temporary storage stores each of these packet data sections with its respective header in a separate (potentially non-consecutive) entry.

The network forwarding IC of some embodiments includes a set of configurable packet processing pipeline resources that operate as both ingress pipelines (for packets received at the network forwarding IC) and egress pipelines (for packets being sent from the network forwarding IC), in addition to a traffic management unit that is responsible for receiving packets from an ingress pipeline and enqueuing the packet for a port associated with an egress pipeline. Typically, a packet is processed by one ingress pipeline, enqueued by the traffic management unit (which may also perform packet replication, if necessary), and processed by one egress pipeline. Each packet processing pipeline (whether acting as an ingress or egress pipeline) includes a parser, a match-action unit (a series of match-action stages), and a deparser, in some embodiments. The parser receives a packet as an ordered stream of data, and based on its instructions and analysis of the packet, identifies packet header fields and stores the packet header fields in a set of data containers (a packet header vector (PHV)) to be sent to the match-action unit. The match-action unit performs various processing to determine actions to be taken on the packet, including modifying the PHV data, sending a copy of certain packet data to a particular temporary storage, etc. After the last match-action stage, the PHV is provided to the deparser, so that the deparser can reconstruct the packet.

In some embodiments, the deparser also sends the packet data portion to the temporary storage (as specified by the instructions from the MAU). The deparser handles dividing the specified packet data portion into multiple sections and generating the headers for each packet data section. The temporary storage, in some embodiments, is a storage (e.g., a buffer) outside of the packet processing pipelines of the network forwarding IC. When a packet processing pipeline sends packet data to the temporary storage, the pipeline typically does not stop its processing of the packet. Thus, if the packet data is sent to the temporary storage from an ingress pipeline, the pipeline still sends the packet to the traffic management unit. Similarly, if the packet data is sent to the temporary storage from an egress pipeline, the pipeline still sends the packet out of the network forwarding IC via its specified port.

As mentioned, the network forwarding IC of some embodiments includes multiple packet processing pipelines. Each of these pipelines may send packet data sections to the temporary storage and, as a result, the packet data sections for a particular packet may not be stored in consecutive entries of the temporary storage. For instance, a packet data section of a first packet may be received from a first pipeline between two packet data sections for a second packet from a second pipeline.

The deparser generates a separate header for each of the packet data sections sent to the temporary storage. In some embodiments, this header identifies a port of the network forwarding IC (e.g., at which the packet was received, or out of which the packet will be sent). In some embodiments, multiple ports correspond to each packet processing pipeline. The header also specifies the size of the packet data section and whether the packet data section is either an initial, middle, or final packet data section for a packet. Some embodiments use a single start bit and end bit that are both set to zero for each middle packet data section, with the initial section for a packet having a value of one for the start bit and the final section for a packet having a value of one for the end bit.

In addition to the section header, each packet data section includes metadata and packet header field data. In some embodiments, the metadata is the same for each packet data section of a particular packet, and includes data stored and/or used by the MAU in processing the packet, that is not part of the packet header itself. This is information that is not part of the packet as reconstructed by the deparser, but was stored in the PHV or otherwise associated with the packet. This information may include a timestamp, conditions of a queue with which the packet is associated, ingress and/or egress ports, etc.

Upon occurrence of a triggering event (e.g., a particular amount of time passing, or the temporary storage reaching a particular capacity), the network forwarding IC outputs the contents of the temporary storage by sending the packet data sections stored in the temporary storage as a single packet (or set of packets, each having multiple packet data sections) to an external receiver that analyzes the packet data sections. In some embodiments, the controller circuitry for the temporary storage coalesces the packet data sections into these output packets and provides the output packets to the traffic management unit, to be sent to an egress pipeline of the network forwarding IC (i.e., the egress pipeline that corresponds to the port out of which the output packets will be sent to their eventual destination).

These output packets include their own header as well as a set of the packet data sections, in some embodiments. The header for an output packet generated by the temporary storage controller in some embodiments indicates the number of packet data sections contained in the output packet, the particular temporary storage that is sending the packet data, a sequence number for the output packet from the particular temporary storage, and potentially other user-configurable data.

The external monitor uses the data stored in the output packet headers and the packet data section headers to reconstruct the packet data portions. The port identifier in the packet data section headers, along with the start and end flags, enables the monitor to identify which packet data sections make up a single packet data portion, even when these sections are non-consecutive (and possibly spread across multiple output packets). In addition, the session identifier and sequence number enable the monitor to identify lost output packets (which could result in losing a start or end packet data section for a packet).

In addition, in some embodiments, when the temporary storage controller generates an output packet, it has the ability to include only a sub-section of one or more of the packet data sections in the output packet. In general, the portion of the packet data sent to the temporary storage by the deparser begins at the start of the packet headers. However, if the external monitor is only interested in specific packet header fields (e.g., only the IP addresses, and not MAC addresses), in some embodiments the temporary storage circuitry is configurable to include the metadata and then only a sub-section of the packet data section, beginning from a configured offset.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a network forwarding IC with a packet processing pipeline that copies portions of packet data (e.g., an entire packet or a portion that is less than an entire packet) to a temporary storage. When the size of the packet data portion is larger than a maximum entry size of the temporary storage, the packet processing pipeline divides the packet data portion into multiple sections, and separately sends these sections to the temporary storage. The packet processing pipeline also generates a separate header for each section, which is sent to the temporary storage along with the packet data section. The temporary storage stores each of these packet data sections with its respective header in a separate (potentially non-consecutive) entry.

Figure 1:
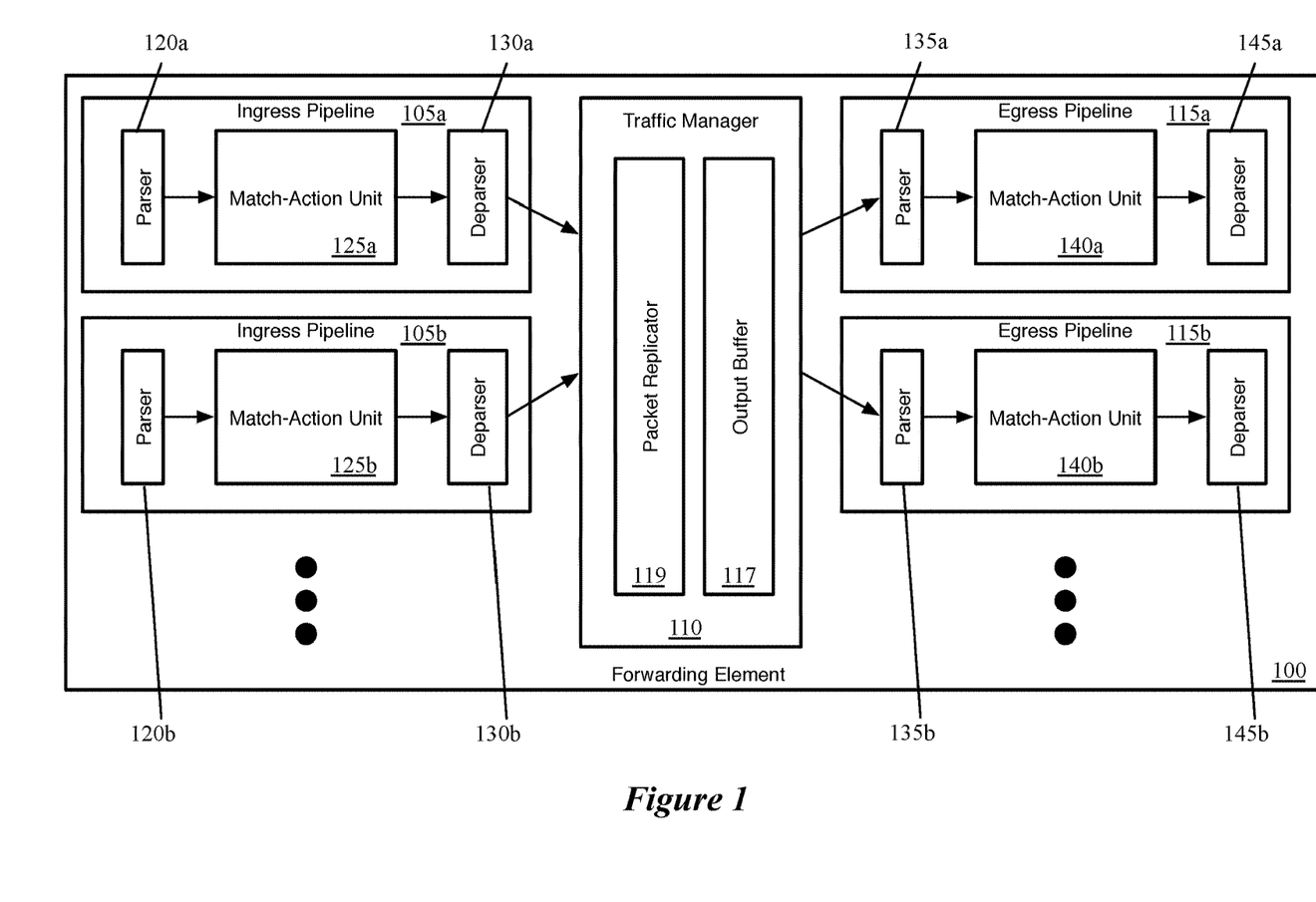
FIG. 1 conceptually illustrates the structure of a network forwarding integrated circuit of some embodiments.

The network forwarding IC of some embodiments includes a set of configurable packet processing pipeline resources that operate as both ingress pipelines (for packets received at the network forwarding IC) and egress pipelines (for packets being sent from the network forwarding IC), in addition to a traffic management unit that is responsible for receiving packets from an ingress pipeline and enqueuing the packet for a port associated with an egress pipeline. FIG. 1 conceptually illustrates the structure of such a network forwarding IC of some embodiments. Specifically, FIG. 1 illustrates several ingress pipelines 105, a traffic management unit (referred to as a traffic manager) 110, and several egress pipelines 115. Though shown as separate structures, in some embodiments the ingress pipelines 105 and the egress pipelines 115 actually use the same circuitry resources. In some embodiments, the pipeline circuitry is configured to handle both ingress and egress pipeline packets synchronously. That is, a particular stage of the pipeline may process both an ingress packet and an egress packet in the same clock cycle. However, in other embodiments, the ingress and egress pipelines are separate circuitry.

Generally, when the network forwarding IC 100 receives a packet, in some embodiments the packet is directed to one of the ingress pipelines 105 (each of which may correspond to one or more ports of the network forwarding IC). After passing through the selected ingress pipeline 105, the packet is sent to the traffic manager 110, where the packet is enqueued and placed in the output buffer 117. The traffic manager 110 then dispatches the packet to the appropriate egress pipeline 115 (each of which may correspond to one or more ports of the forwarding element). In some embodiments, there is no necessary correlation between which of the ingress pipelines 105 processes a packet and to which of the egress pipelines 115 the traffic manager 110 dispatches the packet. That is, a packet might be initially processed by ingress pipeline 105b after receipt through a first port, and then subsequently by egress pipeline 115a to be sent out a second port, etc. In some embodiments, the ingress pipeline specifies to the traffic manager the queue and/or port (corresponding to a particular egress pipeline) out of which the packet will be sent.

Each ingress pipeline 105 includes a parser 120, a match-action unit (MAU) 125, and a deparser 130. Similarly, each egress pipeline 115 includes a parser 135, a MAU 140, and a deparser 145. In some embodiments, each pipeline includes multiple parsers and/or multiple deparsers (e.g., one parser per port that corresponds to the pipeline). The parser 120 or 135, in some embodiments, receives a packet as a formatted collection of bits in a particular order, and parses the packet into its constituent header fields. The parser starts from the beginning of the packet and assigns these header fields to fields (e.g., data containers) of a packet header vector (PHV) for processing. In some embodiments, the parser 120 or 135 separates out the packet headers (up to a designated point) from the payload of the packet, and sends the payload (or the entire packet, including the headers and payload) directly to the deparser without passing through the MAU processing (e.g., on a single wire).

The MAU 125 or 140 performs processing on the packet data (i.e., the PHV). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU.

The deparser 130 or 145 reconstructs the packet using the PHV as modified by the MAU 125 or 140 and the payload received directly from the parser 120 or 135. The deparser constructs a packet that can be sent out over the physical network, or to the traffic manager 110. In some embodiments, the deparser constructs this packet based on data received along with the PHV that specifies the protocols to include in the packet header, as well as its own stored list of data container locations for each possible protocol's header fields.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, as well as additional components. The packet replicator 119 of some embodiments performs replication for broadcast/multicast packets, generating multiple packets to be added to the output buffer (e.g., to be distributed to different egress pipelines). In some embodiments, the packet replicator also performs replication in order to enable the transmission of different packet payload sections to different destinations.

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a queuing policy that is control-plane configurable. When a packet data reference reaches the head of its queue and is scheduled for dequeuing, the corresponding packet data is read out of the output buffer 117 and into the corresponding egress pipeline 115. In some embodiments, packet data may be referenced by multiple pipelines (e.g., for a multicast packet). In this case, the packet data is not removed from this output buffer 117 until all references to the packet data have cleared their respective queues.

In some embodiments, the deparser 330 or 345 also sends the reconstructed packet, or a portion of that reconstructed packet, to a temporary storage (e.g., a mirror buffer) of the network forwarding IC, based on instructions received from the MAU 325 or 340. The mirror buffers, in some embodiments, are storages outside of the packet processing pipelines, which are used to temporarily store copies of packets (or portions of packets), which can later be forwarded to an external destination separate from the actual packet destination (such as a monitoring device).

The mirror buffers of some embodiments have a defined maximum entry size, and some such embodiments enable the packet data portion sent to the mirror buffer to be larger than this maximum entry size. In this case, the deparser divides the specified packet data portion into multiple sections to be sent to the mirror buffer, in addition to generating headers for each such section. In addition to sending the copy of the packet data portion to the mirror buffer, the deparser also continues the normal packet processing. Thus, if the packet data is sent to the temporary storage from an ingress pipeline, the deparser still sends the packet to the traffic management unit. Similarly, if the packet data is sent to the temporary storage from an egress pipeline, the pipeline still sends the packet out of the network forwarding IC via its specified port.

Figure 2:
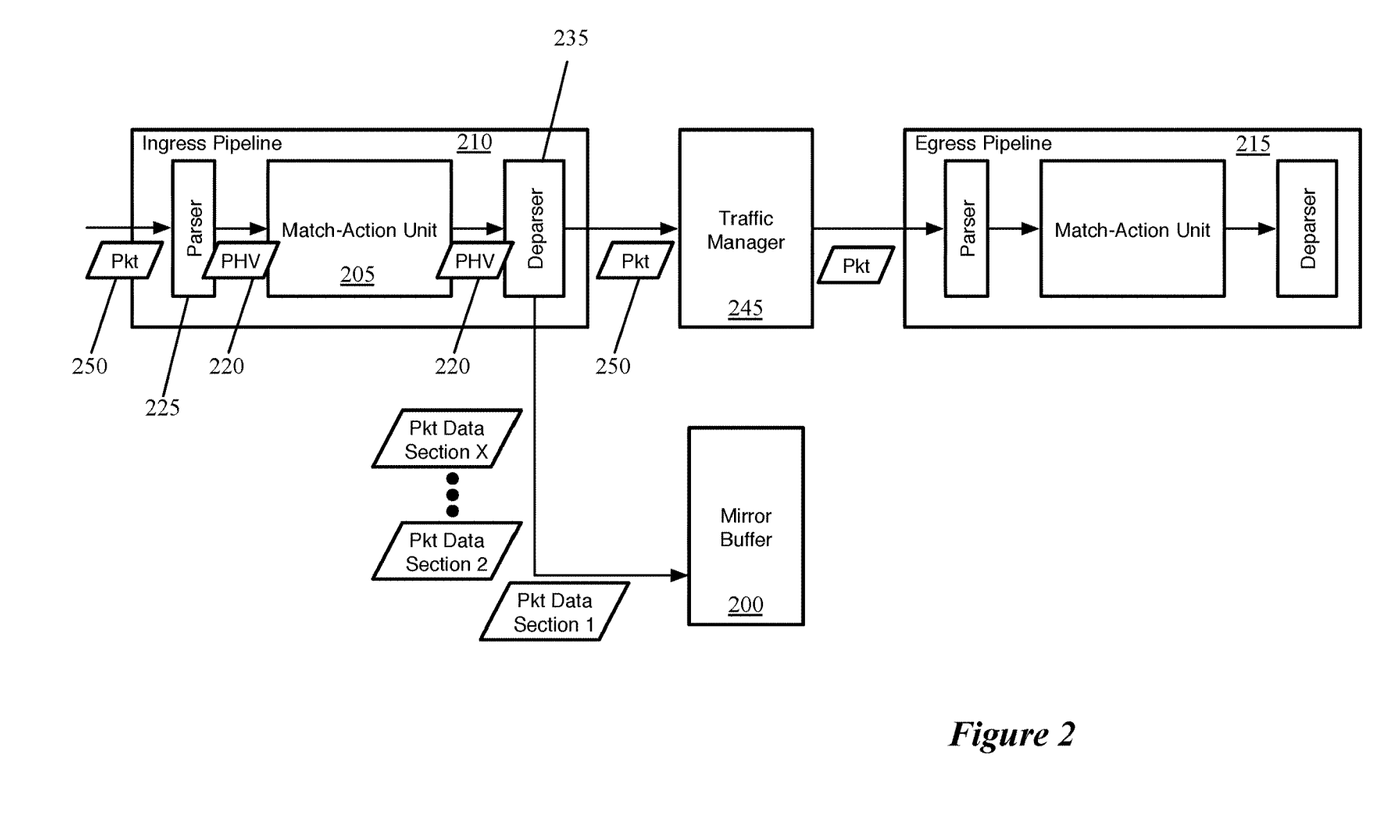
FIG. 2 conceptually illustrates an ingress pipeline sending packet data to a mirror buffer.

FIG. 2 conceptually illustrates an ingress pipeline 210 sending packet data to a mirror buffer 200. While this figure illustrates an ingress pipeline copying packet data to a mirror buffer, it should be understood that both ingress and egress pipelines could copy data to mirror buffers. In some cases, a single mirror buffer stores packet data from both ingress and egress pipelines.

As shown, the ingress pipeline 210 receives a packet 250, which is processed by the parser 225. The parser 225 sends a PHV 220 to the match-action unit 205, which performs various operations to determine an egress port for the packet, modify the PHV 220, etc. In addition, the MAU 205 determines that a portion of the packet header data is to be copied to a mirror buffer 200. This portion of the packet header data could include the entire packet, a specific amount of data, up to a specific protocol header or header field, etc.). In some embodiments, the MAU 205 stores this information (e.g., an identifier for the specific mirror buffer 200, the amount of packet data to copy, etc.). The deparser 235 receives the (now-modified) PHV 220, reconstructs the packet 250, and sends the reconstructed packet to the traffic manager 245. The packet can then be dequeued to the egress pipeline 215 for additional processing before being sent out of its specified egress port.

In addition, the deparser 235 acts on the instructions received from the MAU 205 (e.g., within the PHV) to copy a portion of the packet data to the mirror buffer 200. In some embodiments, the mirror buffer 200 is one of numerous mirror buffers (e.g., 256) of the network forwarding IC, each of which can store packet data. The deparser 235, as shown, sends multiple packet data sections 241-243 to the mirror buffer 200, each of which will be stored in a separate entry of the mirror buffer 200. In some embodiments, each of the packet data sections 241-243 except the last packet data section are the maximum mirror buffer entry size, with the last packet data section including any remaining data to be sent. Other embodiments divide the packet data evenly across the required number of packet data sections. In some embodiments, the deparser 235 generates a separate header for each packet data section 241-243, and stores metadata within the packet data section as well (i.e., in addition to the packet headers).

In some embodiments, the mirror buffer 200 is a unit memory (e.g., an SRAM) and the mirror buffer entries that store the individual packet data sections are individual locations of that memory (e.g., RAM words). The mirror buffer (or its controller circuit) stores data indicating the location of the most recently used RAM word, so that each incoming packet data section can be stored in the next RAM word.

Figure 3:
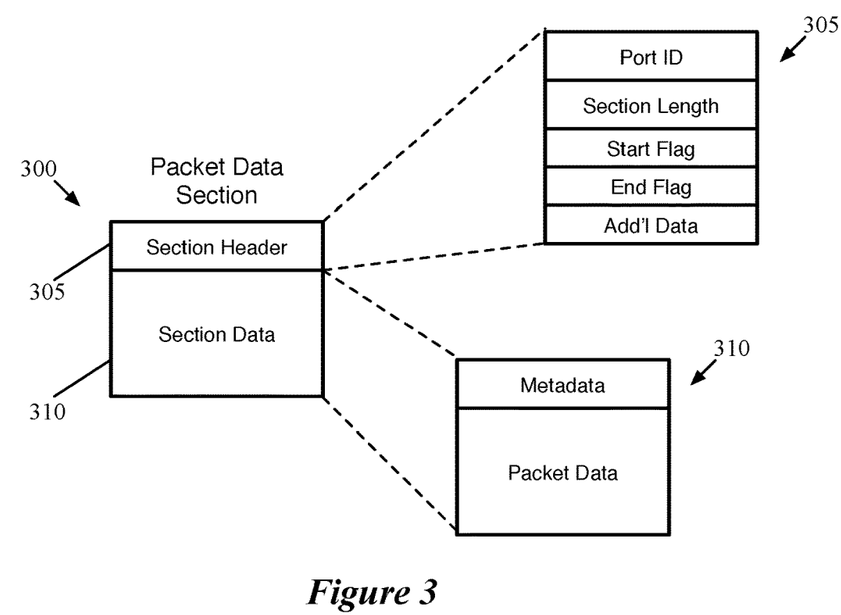
FIG. 3 conceptually illustrates the structure of a packet data section of some embodiments.

FIG. 3 conceptually illustrates the structure of a packet data section 300 of some embodiments. In the following description, example bit lengths of different fields of the packet data section are given. It should be understood that these are merely one example, and different network forwarding ICs may use different lengths for header fields, for the maximum mirror buffer entry size, etc. In addition, it should be understood that different embodiments may use different fields in the packet data section header and/or order the fields differently.

As shown, the packet data section 300 includes a section header 305 and section data 310. In some embodiments, the section header 305 has a fixed size (e.g., four bytes) and the section data 310 may have up to a maximum size (e.g., up to 176 bytes). The section header 305 includes a port identifier (e.g., 16 bits), a length of the section (e.g., a 10-bit value), start and end flags, and four bits of additional data. The port identifier specifies, e.g., the port of the network forwarding IC at which the packet was received or out of which the packet will be sent. The section length can specify the length of the section data 310, the length of the packet data within the section data 310 (i.e., excluding the metadata length), or the length of the packet data section 300 including both the header 305 and the section data 310.

The start and end flags, in some embodiments, are single bit values that are both set to 0 for each middle packet data section, with the initial section for a packet having a value of 1 for the start bit and the final section for a packet having a value of 1 for the end bit. In FIG. 2, the first packet data section 241 has the start flag set to 1, while the last packet data section 243 has the end flag set to 1. The second packet data section 242, and any additional packet data sections for the packet 250, have both of these bits set to 0.

The section data 310 (which can be up to 176 bytes, in some embodiments) includes a metadata section (up 48 bytes) as well as packet data (up to the remainder of the 176 bytes). In some embodiments, the metadata is the same for each packet data section of a particular packet, and includes data stored and/or used by the MAU in processing the packet that is not part of the packet header itself. This is information that is not part of the packet as reconstructed by the deparser, but was stored in the PHV or otherwise associated with the packet. This information may include a timestamp, conditions of a queue with which the packet is associated, ingress and/or egress ports, etc. The packet data includes the packet header field values, arranged in the order of the reconstructed packet.

Figure 4:
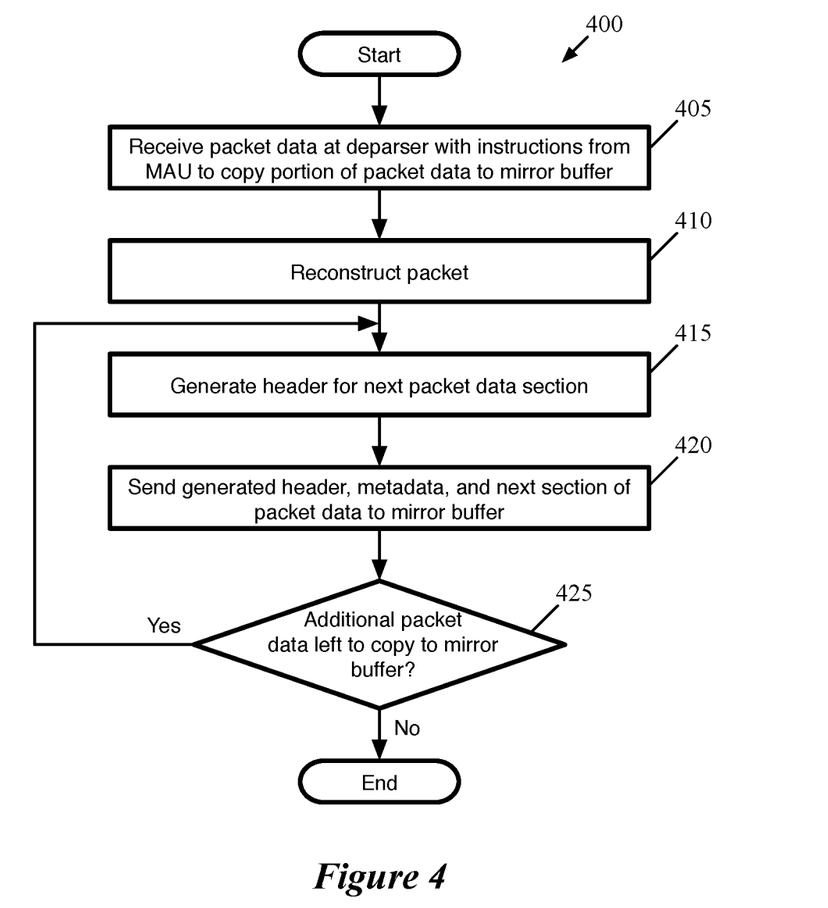
FIG. 4 conceptually illustrates a process of some embodiments to store a copy of a portion of packet data to a mirror buffer.

FIG. 4 conceptually illustrates a process 400 of some embodiments to store a cop of a portion of packet data to a mirror buffer. In some embodiments, the process 400 is performed by a deparser of either an ingress or egress pipeline. It should be understood that the process 400 only shows actions taken relating to the copying of packet data to the mirror buffer, and that the deparser of some embodiments performs additional operations on such packets (e.g., reconstructing the packet, sending the packet to the traffic manager or output port, etc.).

As shown, the process 400 begins by receiving (at 405) packet data at the deparser with instructions from the MAU to copy a portion of the packet data to a mirror buffer. The deparser, as described above, receives a PHV that includes the packet header fields to use in reconstructing the packet. This PHV may also store various instructions for the deparser, traffic manager, etc., in some embodiments, though in other embodiments these instructions are passed to the deparser separately from the PHV. In this case, the instructions from the MAU (determined at one of the match-action stages) specify a particular amount of data to copy to a particular mirror buffer (e.g., copy 500 bytes to mirror buffer 127).

The process then reconstructs (at 410) the packet using the PHV as well as the original packet sent from the parser outside of the MAU. In some embodiments, this reconstruction involves ordering the packet header field values stored in the PHV according to a packet occupancy vector received from the MAU that identifies the order of protocol headers of the packet and a dictionary stored by the deparser that identifies the location in the PHV of various packet header fields. The packet payload (from the original packet) is also added to this ordered set of bits.

In some embodiments, the copying operations 415-425 are performed after the packet has been reconstructed by the deparser. In other embodiments, these operations are performed after the packet headers have been reconstructed but before the payload is added to the packet, while in still other embodiments the packet data is copied using the PHV rather than a reconstructed packet.

The process 400 generates (at 415) a header for the next packet data section. If the portion of packet data to copy is less than the maximum entry size of the specified mirror buffer, then the first packet data section is the only such section. The packet data section header of some embodiments is described above by reference to FIG. 3. In some embodiments, the header data is fixed by the hardware, and is thus not configurable by an administrator. For the first packet data section, the deparser sets the start flag bit to 1, and for the last section sets the end flag bit to 1. If the packet data portion only requires one section, then both bits are set to 1 for this section.

With the header generated for the next packet data section, the process sends (at 420) the generated header, metadata, and next section of packet data to the mirror buffer. In some embodiments, as mentioned, the metadata is the same for each packet data section for a given packet. The metadata, unlike the section header, is user-configurable in some embodiments. That is, an administrator can configure which data is included in the metadata (on either a per-packet, per-buffer, or overall basis). In some embodiments, the deparser generates the metadata at the same time that it reconstructs the packet (using the PHV data or other data associated with the packet). The entire packet data section (the header, metadata, and packet data) is sent to the mirror buffer in a single bitstream, for storage in one of the mirror buffer entries.

The process 400 determines (at 425) whether additional packet data needs to be copied to the mirror buffer. If not all of the specified amount of packet data has yet been copied, the process returns to 415 to generate the next section header and send another packet data section to the mirror buffer. However, if the most recently copied packet data section was the last for the packet, the process 400 ends.

As described above, the network forwarding IC of some embodiments includes multiple packet processing pipelines (which can function as both ingress and egress pipelines). Each of these pipelines may send packet data sections to the temporary storage and, as a result, the packet data sections for a particular packet may not be stored in consecutive entries of the temporary storage. For instance, a packet data section of a first packet may be received from a first pipeline between two packet data sections for a second packet from a second pipeline.

Figure 5:
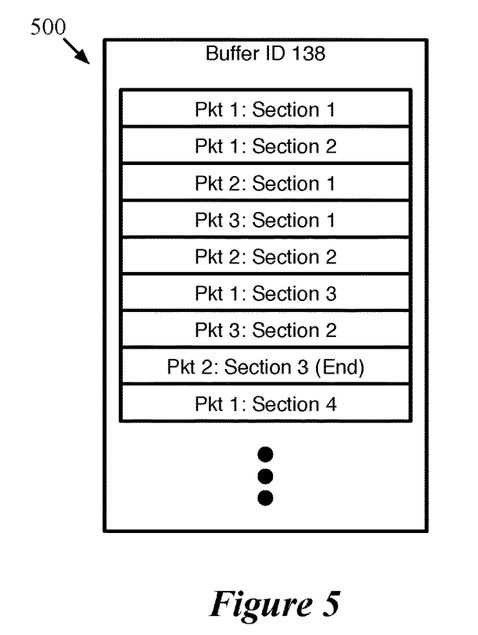
FIG. 5 conceptually illustrates an example mirror buffer with packet data sections arranged in the entries (cells) of the mirror buffer.

FIG. 5 conceptually illustrates an example mirror buffer 500. This example mirror buffer 500 shows packet data sections arranged in the entries (cells) of the mirror buffer.

In this case, the illustrated portion of the mirror buffer 500 shows packet data sections from three different packets. The packets may have different numbers of packet data sections (packet 2 has only three sections, while packet 1 has at least four sections). The first two sections stored in the mirror buffer 500 belong to packet 1, then the subsequent sections for packet 1 are interleaved with sections of packet 2 and packet 3.

The mirror buffers of some embodiments store the packet data so that this data can be separately forwarded to a destination that is generally different than the destination of the original packets (e.g., an external monitor that analyzes the packet data). Upon occurrence of a triggering event (e.g., a particular amount of time passing, or the mirror buffer reaching a particular capacity), the network forwarding IC outputs the mirror buffer contents. Some embodiments send the packet data sections stored in the mirror buffer as a single packet (or set of packets, each having one or more packet data sections) to an external receiver that reconstructs the portions of packet data from the individual packet data sections and analyzes the packet data. In some embodiments, the controller circuitry for the temporary storage coalesces the packet data sections into these output packets and provides the output packets to the traffic manager, to be sent to a particular egress pipeline (e.g., the egress pipeline that corresponds to the port out of which the output packets will be sent to their eventual destination).

Figure 6:
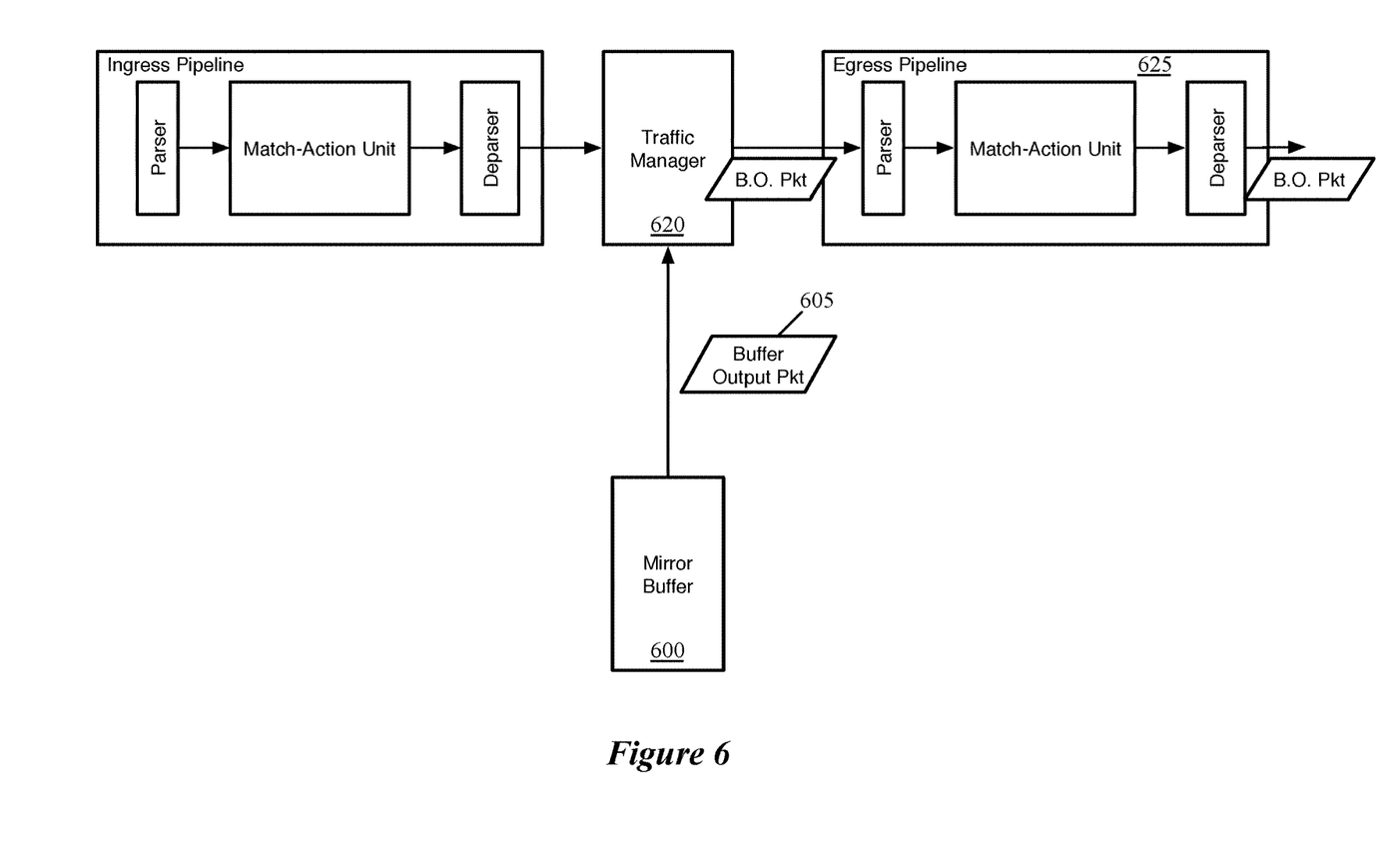
FIG. 6 conceptually illustrates a mirror buffer outputting its contents as a single buffer output packet.

FIG. 6 conceptually illustrates a mirror buffer 600 outputting its contents as a single buffer output packet 605. This buffer output packet 605 includes, in some embodiments, its own header as well as a set of one or more packet data sections. In some embodiments, the buffer output packet size is limited by a maximum packet size, either of the network forwarding IC or of the network across which the buffer output packet will be transmitted. As shown, the mirror buffer 600 outputs this packet 605 to the traffic manager 620, along with an instruction as to the output port (and/or queue) for the packet. This allows the traffic manager 620 to enqueue the packet for delivery to an egress pipeline 625. Once the buffer output packet 605 is sent to the egress pipeline 625, the egress pipeline processes the buffer output packet 605 and sends the packet out of its specified port.

Figure 7:
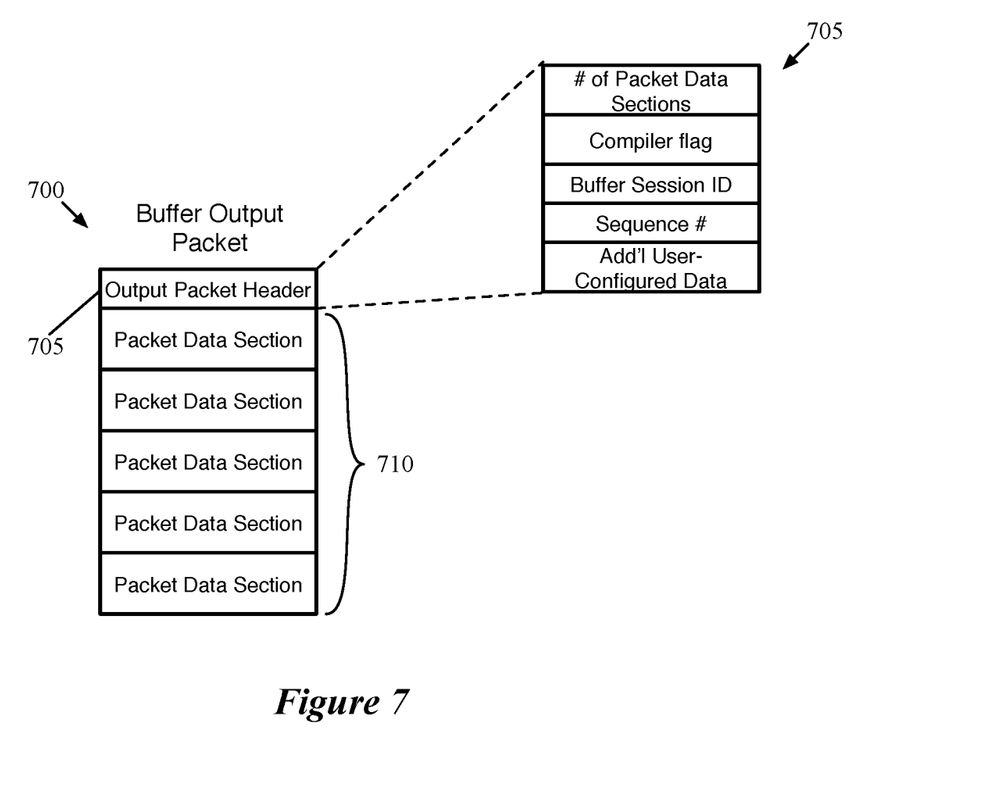
FIG. 7 conceptually illustrates the structure of a buffer output packet of some embodiments.

FIG. 7 conceptually illustrates the structure of a buffer output packet 700 of some embodiments. As with the packet data section shown in FIG. 3, it should be understood that example bit lengths given in the description are merely one example, and different network forwarding ICs may use different lengths for the header fields. It should also be understood that different embodiments may use different fields in the packet data section header and/or order the fields differently. In addition, it should be understood that the buffer output packet structure 700 describes the payload structure of a packet that will actually be sent to one or more destination addresses. The actual packet sent out will include various protocol headers (e.g., Ethernet, IP, TCP/UDP, etc.) so as to enable the packet data to reach its destination. In some embodiments, this information is added at the mirror buffer, while in other embodiments the egress pipeline that processes the buffer output packet 700 adds the appropriate headers (e.g., by mapping the buffer session ID to a destination).

As shown, the buffer output packet 700 includes an output packet header 705 and a set of packet data sections 710. Some embodiments send a fixed number of packet data sections with each buffer output packet, or send as many sections as can fit up to a maximum possible size. Other embodiments send the contents of the mirror buffer at a particular time (e.g., after a fixed time period, or when the buffer hits a threshold capacity) as one or multiple buffer output packets.

In some embodiments, the output packet header 705 has a fixed size or a fixed size range. In some embodiments, a portion of the output packet header is configurable within a range of lengths (e.g., so that the output packet header has a size of 8-16 bytes). The output packet header 705 includes a count of the number of packet data sections (e.g., an 8-bit value), a compiler flag (e.g., an 8-bit value), a buffer session identifier (e.g., a 16-bit value), a sequence number (e.g., a 32-bit value), and any additional user-configured data (e.g., 0-8 bytes of data).

The buffer session identifier of some embodiments identifies the specific mirror buffer that stored the packet data sections 710 and outputs the buffer output packet 700 (i.e., among the numerous different mirror buffers of the network forwarding IC). The sequence number is a value incremented with each buffer output packet, that allows the eventual receiver that analyzes the packet data slices to identify that (i) all data is received and (ii) the order of that data. In some embodiments, if the mirror buffer drops any of its data, it skips a sequence number value to indicate to the receiver that data is missing.

The external receiver uses the data stored in the output packet headers and the packet data section headers to reconstruct the packet data portions. The port identifier in the packet data section headers, along with the start and end flags, enables the monitor to identify which packet data sections make up the data from a single original packet, even when these sections are non-consecutive (and possibly spread across multiple buffer output packets). In addition, the session identifier and sequence number enable the monitor to identify lost output packets (which could result in losing a start or end packet data section for a packet).

As mentioned above, when the deparser copies a portion of packet data to the mirror buffer (as one or more packet data sections), in some embodiments the portion is required to start at the beginning of the packet. However, the external receiver might only be interested in certain header fields that start in the middle of this packet data stream (e.g., only the IP header fields, and not the Ethernet header fields). Thus, in some embodiments the mirror buffer circuitry is configurable to exclude a portion of the packet data from the buffer output packet.

Specifically, in some embodiments, when generating the buffer output packet, some embodiments remove a fixed amount from the start of the packet data (generally, data need not be removed from the end of the packet data, as this data would not be copied to the mirror buffer in the first place). In some such embodiments, this fixed amount is removed from only the first packet data section for a particular packet. The fixed amount of data removed for sending to the external receiver is configurable (e.g., by an administrator) on a per-packet or per-session basis in different embodiments.

Figure 8:
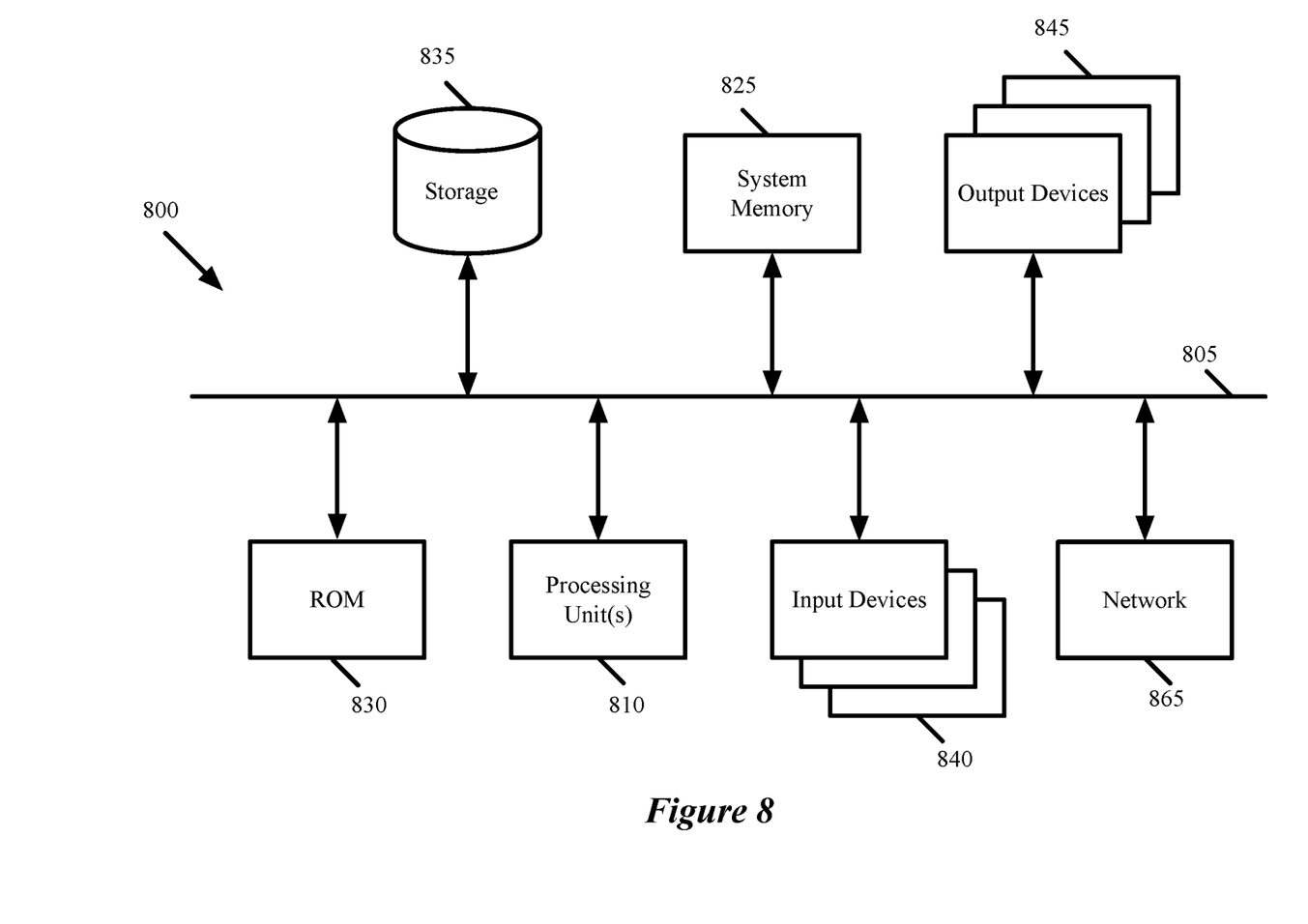
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835. From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method performed in a network forwarding system, the method comprising:
   receiving packet data with an instruction to copy a portion of the packet data to a temporary storage of the network forwarding system, wherein the portion is larger than a maximum entry size of the temporary storage;
   generating a header for one or more of a plurality of packet data sections for storage in entries of the temporary storage, wherein at least one packet data section comprises a sub-portion of the portion of the packet data, a first packet data section comprises an identifier that the first packet data section is an initial packet data section for the portion of the packet data, and a second packet data section comprises an identifier that the second packet data section is a last packet data section for the portion of the packet data; and providing the packet data sections with the generated header to the temporary storage for storage in a plurality of separate temporary storage entries.

2. The method of claim 1, wherein the method is performed by a deparser of a packet processing pipeline of the network forwarding system.

3. The method of claim 1, wherein a size of the packet data section is less than or equal to the maximum entry size of the temporary storage.

4. The method of claim 1, wherein the header for one or more of the temporary storage entries comprises a port identifier for the packet and a size of the temporary storage entry.

5. The method of claim 1, wherein the identifiers are used by a receiver of the packet data sections to reconstruct the portion of the packet data.

6. The method of claim 1, wherein the portion of the packet data comprises (i) packet headers and (ii) metadata regarding the packet.

7. The method of claim 6, wherein the metadata comprises data used by a packet processing pipeline to determine actions to perform on the packet.

8. The method of claim 1, wherein at least one packet data section comprises a first sub-section storing metadata and a second subsection storing packet headers.

9. The method of claim 1, wherein the temporary storage receives and stores packet data sections for a plurality of packets.

10. A method performed in a network forwarding system, the method comprising:
   receiving packet data with an instruction to copy a portion of the packet data to a temporary storage of the network forwarding system, wherein the portion is larger than a maximum entry size of the temporary storage;
   generating a header for at least one of a plurality of packet data sections for storage in entries of the temporary storage, at least one packet data section comprising a sub-portion of the portion of the packet data;
   providing the packet data sections with the generated header to the temporary storage for storage in a plurality of separate temporary storage entries; and
   upon a triggering event, providing from the temporary storage at least a subset of the stored packet data sections for a plurality of packets as a single packet with an additional header.

11. The method of claim 10, wherein the additional header identifies a number of total packet data sections in the single packet.

12. The method of claim 10, wherein the single packet is provide to a packet processing pipeline of the network forwarding system.

13. A network forwarding system comprising:
   a packet processing pipeline comprising a parser, a set of match-action stages, and a deparser circuitry; and
   a temporary storage configured to store packet data sections from a plurality of packets for output together as a single packet,
   wherein the deparser circuitry is configured to:
      receive packet data from the set of match-action stages with an instruction to copy a portion of the packet data to the temporary storage of the network forwarding system, wherein the portion is larger than a maximum entry size of the temporary storage;
      generate a header for at least one of a plurality of packet data sections for storage in entries of the temporary storage, wherein at least one packet data section comprises a sub-portion of the portion of the packet data, a first packet data section comprises an identifier that the first packet data section is an initial packet data section for the portion of the packet data, a second packet data section comprises an identifier that the second packet data section is a last packet data section for the portion of the packet data, and the identifiers are used by a receiver of the packet data sections to reconstruct the portion of the packet data; and
      provide the packet data sections with the generated header to the temporary storage for storage in a plurality of separate temporary storage entries.

14. The network forwarding system of claim 13, wherein one or more of the packet data sections is less than or equal to the maximum entry size of the temporary storage.

15. The network forwarding system of claim 13, wherein the header for one or more of the temporary storage entries comprises a port identifier for the packet and a size of the temporary storage entry.

16. The network forwarding system of claim 13, wherein the portion of the packet data comprises an entire packet.

17. The network forwarding system of claim 13, wherein the packet data section comprises a first sub-section storing metadata and a second subsection storing packet headers.

18. A network forwarding system comprising:
   a packet processing pipeline comprising a parser, a set of match-action stages, and a deparser circuitry; and
   a temporary storage configured to store packet data sections from a plurality of packets for output together as a single packet,
   wherein the deparser circuitry is configured to:
      receive packet data from the set of match-action stages with an instruction to copy a portion of the packet data to the temporary storage of the network forwarding system, wherein the portion is larger than a maximum entry size of the temporary storage;
      generate a header for one or more of a plurality of packet data sections for storage in entries of the temporary storage, at least one packet data section comprising a sub-portion of the portion of the packet data; and
      provide the packet data sections with the generated header to the temporary storage for storage in a plurality of separate temporary storage entries,
      wherein the temporary storage is configured to provide the stored packet data sections from the plurality of packets as a single packet upon occurrence of a triggering event, wherein the single packet comprises an additional header that is to identify a number of total packet data sections in the single packet.

19. The network forwarding system of claim 18, wherein the additional header is to identify a number of total packet data sections in the single packet.

20. The network forwarding system of claim 18, wherein the single packet is provided to a packet processing pipeline of the network forwarding system.

* * * * *